(12) United States Patent
Clark

(10) Patent No.: US 6,480,339 B2
(45) Date of Patent: Nov. 12, 2002

(54) CORRECTIVE LENS FOR RIFLE SCOPE

(76) Inventor: Larry W. Clark, Rt. 2, Box 191-H, Doniphan, MO (US) 63935

( * ) Notice: Subject to any disclaimer, the term of this patent is extended or adjusted under 35 U.S.C. 154(b) by 38 days.

(21) Appl. No.: 09/775,826

(22) Filed: Feb. 5, 2001

(65) Prior Publication Data

US 2002/0105730 A1 Aug. 8, 2002

(51) Int. Cl.[7] .............................................. G02B 15/02
(52) U.S. Cl. ...................................... 359/675; 359/600
(58) Field of Search ................................ 359/672–675, 359/600

(56) References Cited

U.S. PATENT DOCUMENTS

| 1,508,043 A | 9/1924 | Barrows |
| 3,131,477 A | 5/1964 | Thomas |
| 3,753,611 A | 8/1973 | Ebbesen |
| 4,119,984 A | 10/1978 | Zajac |
| 4,936,667 A | 6/1990 | Rohr et al. |
| 5,299,067 A | 3/1994 | Kutz et al. |
| 5,365,670 A | 11/1994 | Klimochko |
| 5,495,676 A | 3/1996 | Chesnut et al. |
| 5,561,563 A | 10/1996 | Chesnut |
| 5,572,795 A | 11/1996 | Kregloh |
| 5,835,289 A | 11/1998 | Berry |

FOREIGN PATENT DOCUMENTS

| DE | 235 924 A1 | 5/1986 |
| JP | 2-293806 | 12/1990 |

Primary Examiner—Scott J. Sugarman
(74) Attorney, Agent, or Firm—Richard C. Litman

(57) ABSTRACT

A corrective lens for a rifle scope comprising a removable flexible tubular boot attachable to an end of the scope and having a corrective lens suited to the user to eliminate the wearing of eyeglasses while sighting through the scope. The lens can fit within the boot or be threaded onto the boot by means of a lens cap.

9 Claims, 4 Drawing Sheets

CORRECTIVE LENS FOR RIFLE SCOPE

BACKGROUND OF THE INVENTION

1. Field of the Invention

The present invention relates generally to telescopic sights for rifles. More specifically, the invention is a flexible tube device retaining a prescription or corrective lens within one end of the device to add to a telescopic rifle sight to eliminate the use of eyeglasses.

2. Description of the Related Art

The related art of interest describes various adaptive lens devices, but none discloses the present invention. There is a need for an inexpensive device for correcting a rifle scope to avoid the necessity of using eyeglasses with corrective lenses while sighting through a rifle scope. The related art will be discussed in the order of perceived relevance to the present invention.

U.S. Pat. No. 3,131,477, issued on May 5, 1964 to Robert S. Thomas, describes a protective rifle sight covering comprising a plastic or rubber sleeve that retains a transparent lens or disc made from any suitable material, such as plastic or glass, on a telescopic rifle sight. The device is designed to overcome the problem of cleaning the optical lenses of a telescopic sight which are recessed within the telescope tube, and can become foggy or obstructed in inclement weather. The device attaches the transparent lens to the scope by a press fitted or friction fitted sleeve, an internally threaded ring, an externally threaded ring, or an inner end portion sealed within the end of the sight by an O-ring.

U.S. Pat. No. 4,119,984, issued on Oct. 10, 1978 to Cyril Zajac, describes an eyepiece for use in conjunction with a viewfinder of a camera comprising a plastic and rubber tube with a prescription lens held within the tube by an O-ring that has an adapted that snap fits to the viewfinder. The device permits users to view the object being photographed through a lens that fits their prescription without using eyeglasses.

U.S. Pat. No. 5,299,067, issued on Mar. 29, 1994 to Hihn R. Kutz et al., describes an auxiliary lens attachment comprising a sectional tube that can have a prescription or colored lens installed within the tube. The attachment is designed to slide onto the viewing end of a rifle scope. The lens is secured between two portions of a separable sleeve that threadably engage one another and require a distance adjusting member in-between. The device is distinguishable for its multiple sleeves and an adjusting member.

U.S. Pat. No. 5,495,676, issued on Mar. 5, 1996, and U.S. Pat. No. 5,561,563 to M. Gaines Chestnut et al., describe a cross-polarization method and device for a hinged lens cap assembly on both ends of a firearm scope. The device is distinguishable for requiring a hinged lens.

U.S. Pat. No. 5,572,795, issued on Nov. 12, 1996 to Daniel J. Kregloh, describes a magnification device lens assembly comprising a lens-less assembly having three different diameters increasing in size from the eye to the eyepiece lens of a rifle scope. The device is made from rigid plastic material for slidably mounting or can be threaded on the eyepiece. The device is distinguishable for not requiring any additional lens.

U.S. Pat. No. 5,835,289, issued on Nov. 10, 1998 to James M. Berry, describes an auxiliary lens attachment to correct astigmatism for various optical devices comprising a threaded lens attachment containing a prescription lens inserted between the eyepiece and the objective lens. The device is distinguishable for requiring the insertion between two optical members.

U.S. Pat. No. 1,508,043, issued on Sep. 9, 1924 to Frank L. Barrows, describes an optical attachment for various optical instruments comprising a lens mount housing the auxiliary prescription lens between a felt ring. The lens mount is mounted on a sleeve with spring clips. The device is distinguishable for its lens mounted in a rigid mounting with different structural features.

U.S. Pat. No. 3,753,611, issued on Aug. 21, 1973 to Ejvind Ebbesen, describes a bifocal magnifying glass device to be held in front of one eye comprising one or more turnable lens systems with different fields of vision for repairing watches. A rigid collar contains a fixed magnifying glass and a turnable semicircular lens in the rear. The device is distinguishable for its use independent of another optical device and the inclusion of a rotatable lens.

U.S. Pat. No. 4,936,667 issued on Jun. 26, 1990, to Wolf-Dieter Rohr et al. describes a binocular microscope attachment for correction of ametropia comprising a pair of rigid holders slipped over and frictionally by the microscope's binocular eyepiece tubes. Each holder has a retainer for receiving eyeglass lenses appropriate for correcting the user's ametropia problem. The device is distinguishable for rigid holders for the corrective lens.

U.S. Pat. No. 5,365,670, issued on Nov. 26, 1994 to Vernon W. Klimochko, describes a hunting scope with an enhanced magnification lens accessory comprising a lens structure for mounting on a forward end of a hunting scope for magnification. The lens is supported by a telescoping tube which has a clamp ring attached to the opposite end. The device is distinguishable for its telescopic tube structure and clamp ring.

German Patent Application No. 235 924 A1, published on May 21, 1980, describes a lens component mounting having a non-distorting body with a guiding bore and a flat clamping face on the side towards the adjusting mechanism. The device is distinguishable for its inflexible body and flanged element for engaging an optical instrument.

Japan Patent Application No. 2-293806, published on Dec. 5, 1990, describes a structure for mounting auxiliary optical parts and a lens position controller of a camera. The device is distinguishable for its rigid casing.

None of the above inventions and patents, taken either singularly or in combination, is seen to describe the instant invention as claimed. Thus, a corrective lens for a rifle scope which is economical and useful for eliminating the use of especially bifocal or reading eyeglasses is desired.

SUMMARY OF THE INVENTION

The present invention is directed to a readily removable optic lens for a telescopic sight on a rifle which enables a user, e.g., a hunter, if a wearer of bifocal or reading eyeglasses, to dispense with the eyeglasses and still use the telescopic sight. The first embodiment includes a support for the glass or plastic lens comprising a bell-shaped cylindrical boot, made of either rubber or plastic, having a flared distal end and a slight internal ridge to fit the telescopic sight, and a flanged proximate end having an internal peripheral groove to fit the lens with a bevelled periphery within. A second embodiment modifies the proximate end of the boot to employ a capped lens threadable on the end. The lens can vary in diopters to provide a selection of weak, medium and strong focal lengths. The color of the boot is preferably black. The boot can have a range of various diameters to fit snugly on any telescopic sight. The device can be readily attached to a telescopic sight without the use of any tool. An ergonomic benefit is gained by utilizing the present invention, because fogging of the lens can be readily eliminated, whereas the hunter with eyeglasses will be tempted to shoot with foggy eyeglasses resulting in crippling the animal. The boot is short enough to permit use without fear of injury from recoil of the rifle, which can cause kick back up to three inches, sine the boot is only about one-quarter inches long.

Accordingly, it is a principal object of the invention to provide a device for a telescopic sight which would obviate the wearing of eyeglasses when using a telescopic gun sight.

It is another object of the invention to provide a device which would readily attach to a telescopic sight without the use of any tool.

It is a further object of the invention to provide a device having a flexible body and a lens attached at a proximate end either internally or externally.

Still another object of the invention is to provide a device which would prevent the crippling of animals due to a hunter's blurred vision by providing a corrective lens attachment for a telescopic gun sight.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
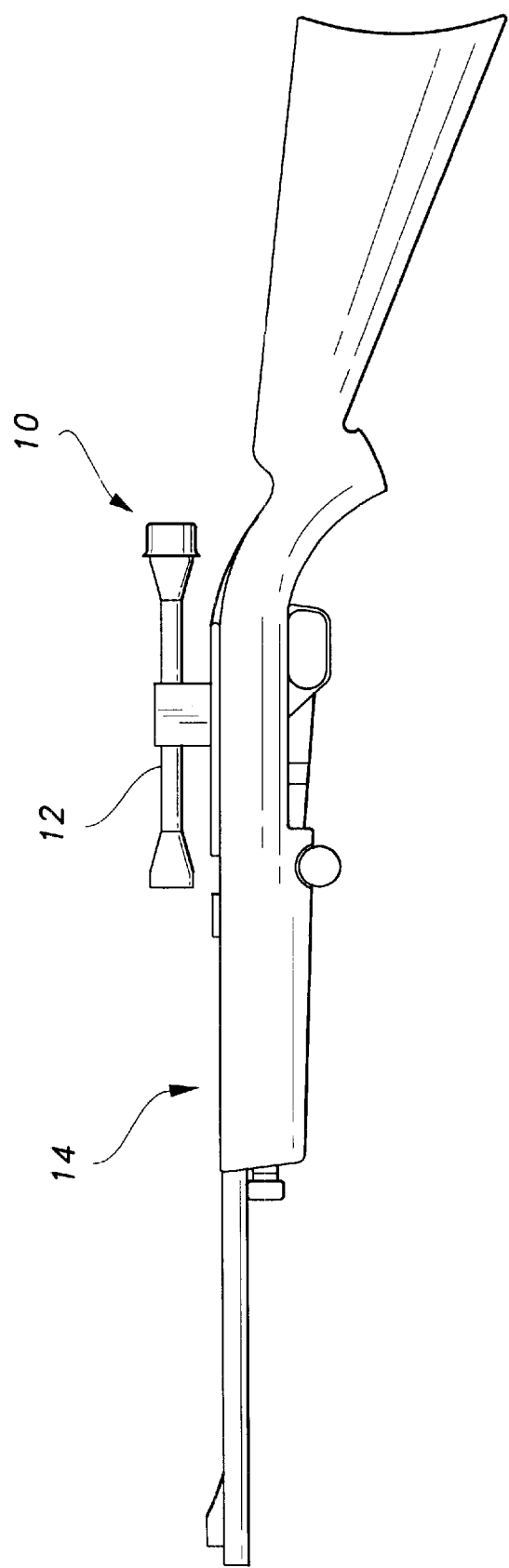
FIG. 1 is an environmental view of a corrective lens device for a rifle scope according to the present invention.
Figure 2:
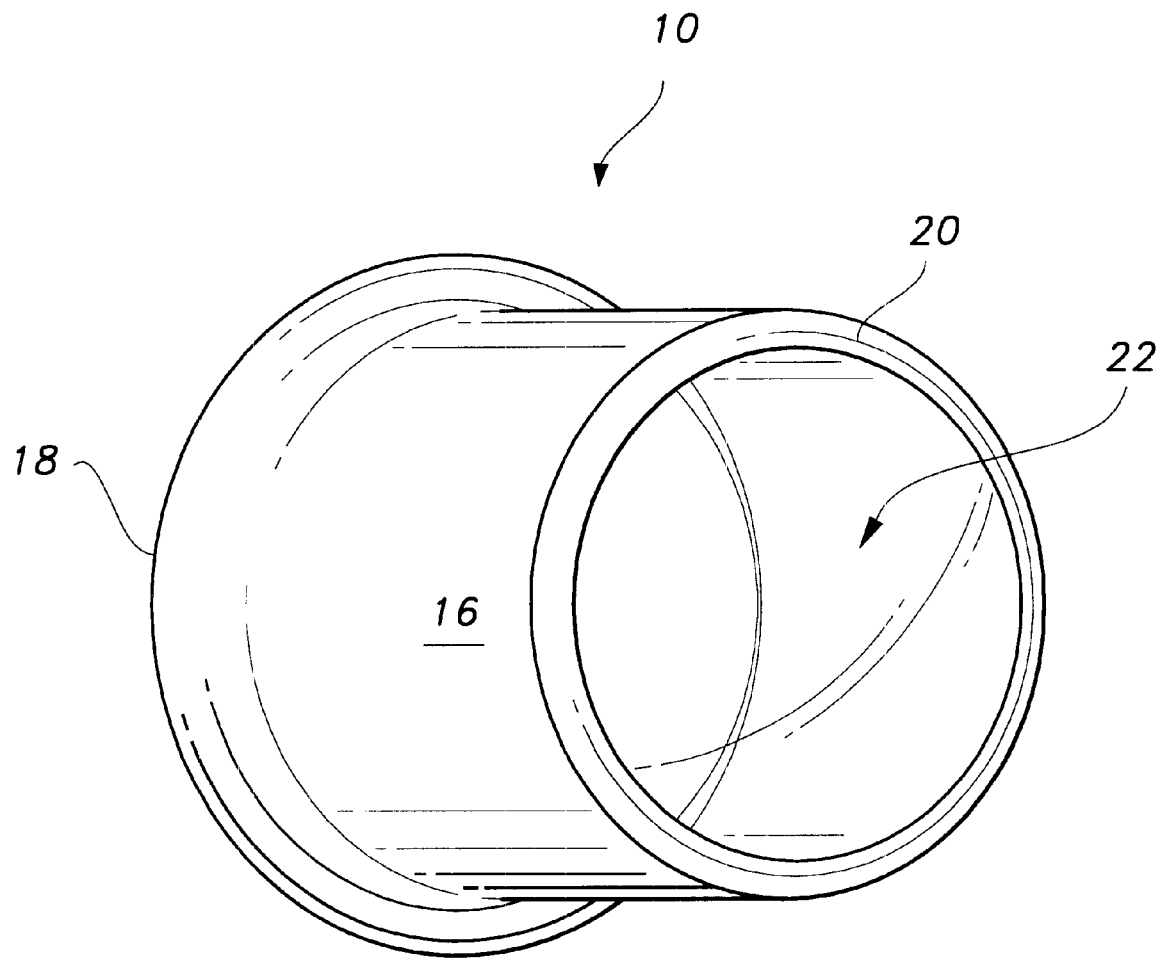
FIG. 2 is a perspective view of a first embodiment of the corrective lens device.
Figure 3:
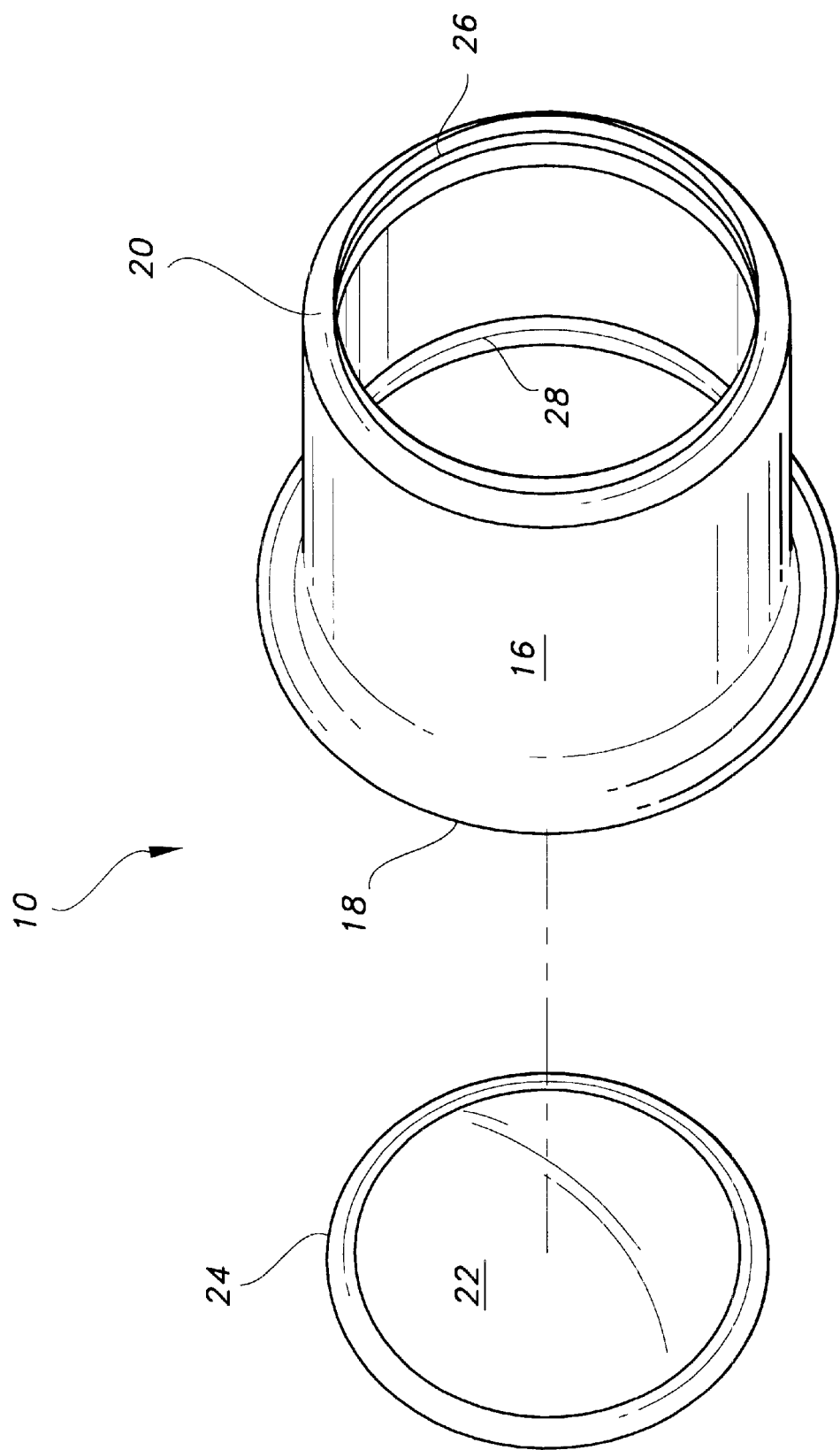
FIG. 3 is an exploded perspective view of the corrective lens device of FIG. 2.

The present invention illustrated in FIGS. 1 through 3 is directed to a first embodiment of a corrective lens device 10 for a telescopic rifle sight 12 on a rifle 14 (FIG. 1) which would eliminate the use of eyeglasses. The corrective lens device 10 comprises a flexible tubular bell-shaped body 16 having a flared distal end 18 and a flanged proximate end 20. A circular lens 22 having a double-bevelled peripheral edge 24 fits snugly within a groove 26 inside the flanged proximate end 20. A peripheral raised region or ridge 28 is formed proximate the flared distal end 18 for the purpose of providing a frictional securement for the device 10 on the rifle sight 12.

The flexible tubular body 16 is made of a material selected from either plastic or rubber, and preferably colored black. The lens 22 is made of a material selected from either glass or plastic. The lens 22 is a corrective lens. The optical power of the lens 22 can preferably be made in three powers such as weak, medium and strong.

Figure 4:
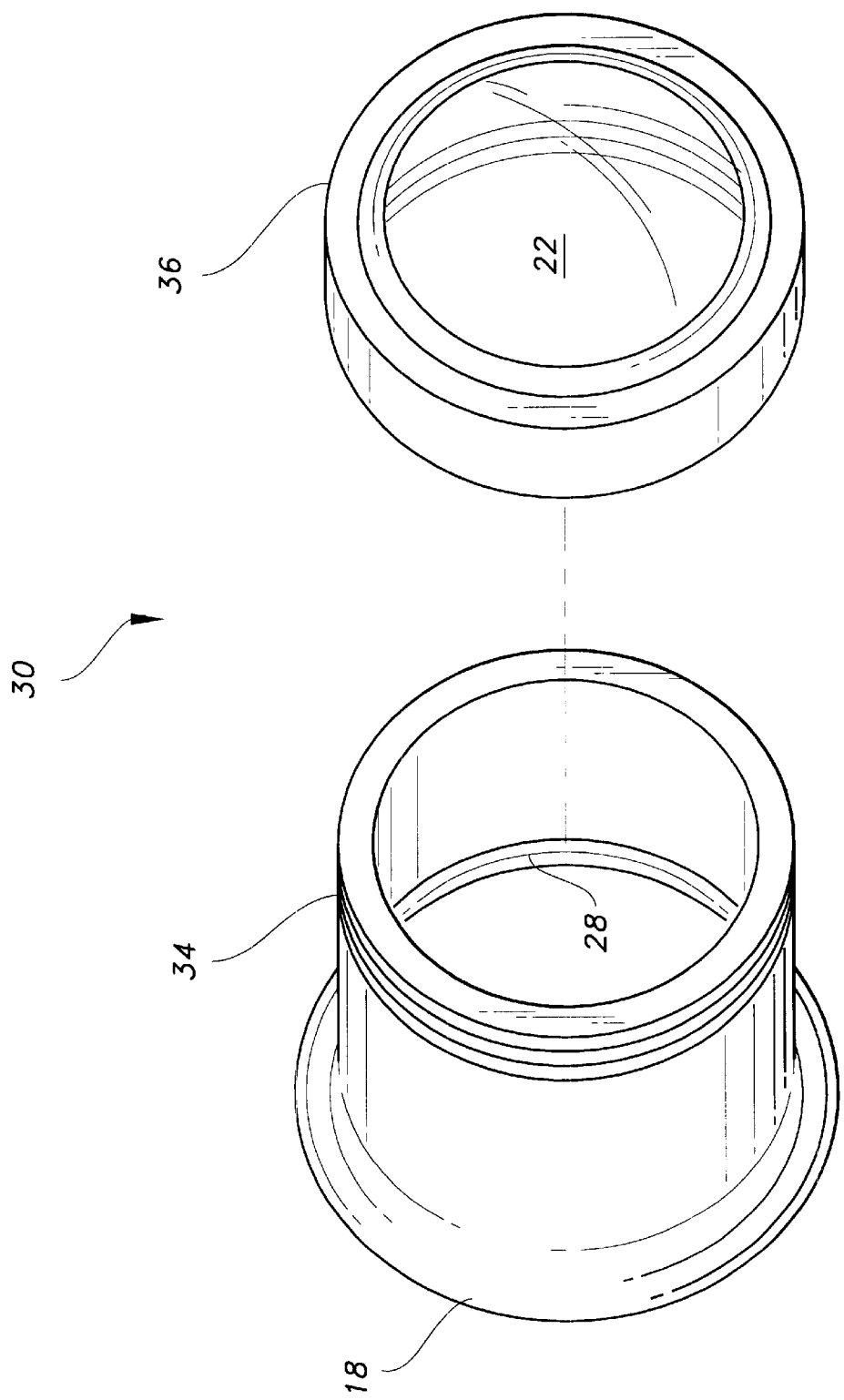
FIG. 4 is an exploded perspective view of a second embodiment of the corrective lens device having the lens threaded onto the body.

FIG. 4 is directed to a second embodiment of a corrective lens device 30 utilizing a modified tubular body 32 having a flared distal end 18 and an externally threaded proximate end 34 for fitting a plastic or metal lens cap 36 with a lens 22. The distal end 18 still has an internal ridge 28 as in the first embodiment. This embodiment enables the replacement of different powered lenses 22 without removing the tubular body 32 from the telescopic rifle sight 12 for different users.

With the use of the devices 10, 30, it has been found that a rifle scope can be fitted with the corrective lens device to replace eyeglasses from being worn to prevent deleterious fogging and injury.

The devices 10 and 30 benefit both near-sighted and far-sighted users, since only a ¼ inch space is taken by attaching these corrective lens devices. It has been found that fogging of eyeglasses is a problem when used because one must either defog the eyeglasses or shoot with fogged eyeglasses and possibly cripple the animal. Moreover, near-sighted hunters with eyeglasses must elevate their heads to see clearly, which is a problem.

Although the corrective lens for a rifle sight has been shown with a tubular body which forms a friction fit for attachment to the telescopic sight, it will be obvious to those skilled in the art that the corrective lens may be mounted in a tube which is threaded for attachment to the telescopic sight.

It is to be understood that the present invention is not limited to the embodiments described above, but encompasses any and all embodiments within the scope of the following claims.

I claim:

1. A corrective lens device for a rifle scope comprising:

a flexible tubular body having a flared distal end and a proximate end, the distal end being adapted for attachment to a rifle scope; and a corrective lens attached to the proximate end;

whereby a rear end of a rifle scope can be fitted with the corrective lens device so that the rifle scope may be used without wearing corrective eyeglasses mounted on a conventional frame.

2. The corrective lens device according to claim 1, wherein a peripheral ridge is located adjacent to the flared distal end.

3. The corrective lens device according to claim 1, wherein the proximate end of the flexible tubular body is narrowed with a peripheral flange.

4. The corrective lens device according to claim 3, wherein the proximate end of the flexible tubular body has an internal groove to capture the lens.

5. The corrective lens device according to claim 4, wherein the lens has a double bevelled periphery to fit in the internal groove.

6. The corrective lens device according to claim 1, wherein the proximate end of the flexible tubular body is externally threaded.

7. The corrective lens device according to claim 6, wherein the lens is fixed in an internally threaded lens cap for threading onto the externally threaded proximate end.

8. The corrective lens device according to claim 1, wherein the flexible tubular body is made of a material selected from the group consisting of plastic and rubber.

9. The corrective lens device according to claim 1, wherein the lens is made of a material selected from the group consisting of glass or plastic.

* * * * *